US012108761B2

United States Patent
Nakamura et al.

(10) Patent No.: US 12,108,761 B2
(45) Date of Patent: *Oct. 8, 2024

(54) MESOSTIGMATA MITE CONTROL AGENT

(71) Applicant: MEIJI SEIKA PHARMA CO., LTD., Tokyo (JP)

(72) Inventors: Satoshi Nakamura, Yokohama (JP); Takehiko Inoue, Tokyo (JP); Haruka Takeuchi, Yokohama (JP)

(73) Assignee: MEIJI SEIKA PHARMA CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,012

(22) Filed: Jun. 21, 2022

(65) Prior Publication Data

US 2022/0312766 A1    Oct. 6, 2022

Related U.S. Application Data

(62) Division of application No. 16/494,571, filed as application No. PCT/JP2018/010445 on Mar. 16, 2018, now abandoned.

(30) Foreign Application Priority Data

Mar. 17, 2017 (JP) .................................. 2017-052200

(51) Int. Cl.
*A01N 43/42* (2006.01)
*A01P 7/04* (2006.01)

(52) U.S. Cl.
CPC ................ *A01N 43/42* (2013.01); *A01P 7/04* (2021.08)

(58) Field of Classification Search
None
See application file for complete search history.

(56) References Cited

U.S. PATENT DOCUMENTS

| | | | |
|---|---|---|---|
| 5,190,952 | A | 3/1993 | Minowa et al. |
| 7,880,006 | B2 | 2/2011 | Yamamoto et al. |
| 2003/0176459 | A1 | 9/2003 | Yamamoto et al. |
| 2004/0087618 | A1 | 5/2004 | Yamamoto et al. |
| 2007/0203181 | A1 | 8/2007 | Yamamoto et al. |
| 2017/0135347 | A1 | 5/2017 | Kagami |

FOREIGN PATENT DOCUMENTS

| | | |
|---|---|---|
| CN | 103415209 A | 11/2013 |
| EP | 0990648 A1 | 5/2000 |
| EP | 1 559 321 A1 | 8/2005 |
| JP | 61-1189204 A | 8/1986 |
| JP | 03-041004 A | 2/1991 |
| JP | 3-128355 B2 | 5/1991 |
| JP | 2633377 B2 | 7/1997 |
| JP | 2006-36714 A | 2/2006 |
| JP | 2006-124377 A | 5/2006 |
| JP | 4242156 B2 | 3/2009 |
| JP | 2012-87090 A | 5/2012 |
| JP | 2015-227325 A | 12/2015 |
| KR | 10-2017-0020768 A | 2/2017 |
| WO | 01/92231 A1 | 12/2001 |
| WO | 2004/032629 A1 | 4/2004 |
| WO | 2006/013896 A1 | 2/2006 |
| WO | 2007/104726 A1 | 9/2007 |
| WO | 2015/107133 A1 | 7/2015 |
| WO | 2016/039048 A1 | 3/2016 |
| WO | 2016/068301 A1 | 5/2016 |

OTHER PUBLICATIONS

Office Action, dated Dec. 10, 2021, issued by the Japanese Patent Office in Japanese Application No. 2019-506293.
Extended European Search Report, dated Feb. 24, 2021, issued by the European Patent Office in Application No. 18767524.4.
Partial Supplementary European Search Report, dated Nov. 23, 2020, issued by the European Patent Office in Application No. 18767524.4.
Communication, dated Nov. 4, 2020, issued by The State Intellectual Property Office of the P R. of China in Application No. 201880017512.5.
Communication, dated Sep. 26, 2019, issued in International Application No. PCT/JP2018/010445.
Diane G. Alston et al., "Effects of Fungicide Residues on the Survival, Fecundity, and Predation of the Mites *Tetranychus urticae* (Acari: Tetranychidae) and Galendromus occidentalis (Acari: Phytoseiidae)", Journal of Economic Entomology, Jun. 2004, pp. 950-956, vol. 97, No. 3.
Martina B. Bernard, "Reducing the Impact of Pesticides on Biological Control in Australian Vineyards: Pesticide Mortality and Fecundity Effects on an Indicator Species, the Predatory Mite *Euseius victoriensis* (Acari; Pliytoseiidae)", Journal of Economic Entomology, Dec. 2010, pp. 2061-2071, vol. 103, No. 6.
N.J. Bostanian et al., "Laboratory Tests to Determine the Intrinsic Toxicity of Four Fungicides and Two Insecticides to the Predacious Mite *Agistemus fleschneri*", Phytoparasitica, 2001, pp. 215-222, vol. 29, No. 3.
Mutimura C Gatarayiha et al., "In vitro effects of flutriafol and azoxystrobin on Beauvaria bassiana and its efficacy against Tetranychus urticae", Pest Management Science, 2010, pp. 773-778, vol. 66.
Jessica A. Metzger et al., Topical Toxicity of Pesticides Used in Virginia Vineyards to the Predatory Mite, *Neoselulus fallacis* (Garman), Journal of Entomological Science, Oct. 2002, pp. 329-337, vol. 37, No. 4.

(Continued)

*Primary Examiner* — Bethany P Barham
*Assistant Examiner* — Barbara S Frazier
(74) *Attorney, Agent, or Firm* — Sughrue Mion, PLLC

(57) ABSTRACT

A control agent comprising, as an active ingredient, a specific quinoline derivative compound such as 8-fluoro-2,3-dimethyl-6-(1,1-dimethylethyl)-4-(methylcarbonyl)oxyquinoline, azoxystrobin, picoxystrobin, pyraclostrobin, kresoxim-methyl, trifloxystrobin, metominostrobin, orysastrobin, famoxadone, fluoxastrobin, pyribencarb, cyazofamid, amisulbrom, flutolanil, mepronil, isofetamid, fluopyram, carboxin, thifluzamide, fluxapyroxad, furametpyr, penflufen, penthiopyrad, boscalid, diflumetorim, fluazinam, ferimzone, fenpyroximate, or an acid addition salt of any of these compounds shows an excellent controlling effect on Mesostigmata mites.

5 Claims, No Drawings

(56) References Cited

OTHER PUBLICATIONS

Janusz Piatkowski et al., "Toxicity of Some Pesticides to Predatory Mite *Amblyseius cucumeris* (Oud.) (Acarina, Phytoseudae)", Materialy Sesji Naukowej Instytutu Ochrony Roslin (Poznan), 1991, pp. 285-289, vol. 30, No. 2.

E D Pilling et al., "Azoxystrobin: Fate and Effects in the Terrestrial Environment", Brighton Crop Protection Conference- Pest and Diseases, 1996, pp. 315-322, vol. 1.

Norio Sekita et al., "Toxicity of Pesticides Commonly Used in Japanese Apple Orchards to the Predatory Mite *Typhlodromus pyri* Scheuten (Acari: Phytoseiidac) from New Zealand", Applied Entomology and Zoology, 1986, pp. 173-175, vol. 21, No. 1.

Menelaos C. Stavrinides et al., "Demographic effects of pesticides on biological control of Pacific spider mite (*Tetranychus pacificus*) by the western predatory mite (*Galendromus occidentalis*)", Biological Control, 2009, pp. 267-273, vol. 48, No. 3.

International Search Report for PCT/JP2018/010445 dated, Jun. 19, 2018.

Communication dated Oct. 13, 2022 from the Korean Intellectual Property Office in Application No. 10-2019-7026308.

MESOSTIGMATA MITE CONTROL AGENT

CROSS REFERENCE TO RELATED APPLICATIONS

This application is a Divisional of U.S. application Ser. No. 16/494,571, filed Sep. 16, 2019, which was a National Stage of International Application No. PCT/JP2018/010445 filed Mar. 16, 2018, claiming priority based on Japanese Patent Application No. 2017-052200, filed Mar. 17, 2017.

TECHNICAL FIELD

The present invention relates to a Mesostigmata mite control method and a Mesostigmata mite control agent.

BACKGROUND ART

Mesostigmata mites include red mite (*Dermanyssus gallinae*), northern fowl mite (*Ornithonyssus sylviarum*), tropical rat mite (*Ornithonyssus bacoti*), Varroa mite (*Varroa destructor*), canine nasal mite (*Pneumonyssoides caninum*), and the like. These Mesostigmata mites cause important problems with veterinary hygiene, because they parasitize or suck blood from insects and homoiotherms such as birds and mammals. Conventionally, many control agents have been developed against such mites which parasitize or suck blood from insects or homoiotherms. However, the recent notable decrease in drug sensitivity and the like create a demand for a novel agent that is highly effective and safe.

Patent Literature 1 (Japanese Patent No. 2633377), Patent Literature 2 (Japanese Unexamined Patent Application Publication No. Hei 3-128355), and Patent Literature 3 (International Publication No. WO2006/013896) disclose quinoline derivatives as pesticides, acaricides, or the like for agricultural and horticultural use. However, Patent Literatures 1 to 3 are totally silent about control of Mesostigmata mites that parasitize homoiotherms and the like.

Patent Literature 4 (Japanese Patent No. 4242156) and Patent Literature 5 (International Publication No. WO2004/032629) describe mixed agents containing a halogen-substituted quinoline derivative that shows a controlling effect on red mites and northern fowl mites. However, Patent Literature 4 does not disclose that 2,3-dimethyl-4-quinolinol derivatives represented by the following general formula (1) show an effect on Mesostigmata mites including red mites and northern fowl mites.

International Publication No. WO01/92231 and Japanese Unexamined Patent Application Publication No. 2012-087090 disclose usefulness of 2,3-Dimethyl-4-quinolinol derivatives represented by:

[Chem. 1]

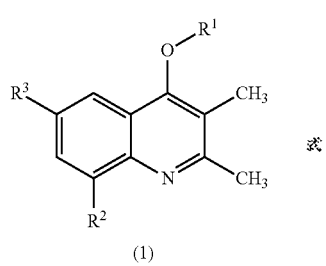

Formula (1)

[in the formula, $R^1$ represents a hydrogen atom, $-COR^4$, $-COOR^4$ (where $R^4$ represents an alkyl group having 1 to 4 carbon atoms), $-CH_2OCH_3$, or $-COCH_2OCH_3$; and $R^2$ and $R^3$ may be the same or different, and represent a hydrogen atom, a halogen atom, an alkyl group having 1 to 4 carbon atoms, or an alkoxy group having 1 to 4 carbon atoms] against rice blast and tea gray blight; however, these documents are totally silent about control of Mesostigmata mites.

CITATION LIST

Patent Literature

[PTL 1] Japanese Patent No. 2633377
[PTL 2] Japanese Unexamined Patent Application Publication No. Hei 3-128355
[PTL 3] International Publication No. WO2006/013896
[PTL 4] Japanese Patent No. 4242156
[PTL 5] International Publication No. WO2004/032629
[PTL 6] International Publication No. WO01/92231
[PTL 7] Japanese Unexamined Patent Application Publication No. 2012-087090

SUMMARY OF INVENTION

Technical Problem

An object of the present invention is to provide a Mesostigmata mite control agent which controls a Mesostigmata mite.

Solution to Problem

The present inventors have conducted intensive study to achieve the above-described object, and consequently have found that compounds represented by the following general formula (1), azoxystrobin, picoxystrobin, pyraclostrobin, kresoxim-methyl, trifloxystrobin, metominostrobin, orysastrobin, famoxadone, fluoxastrobin, pyribencarb, cyazofamid, amisulbrom, flutolanil, mepronil, isofetamid, fluopyram, carboxin, thifluzamide, fluxapyroxad, furametpyr, penflufen, penthiopyrad, boscalid, diflumetorim, fluazinam, ferimzone, and fenpyroximate, or acid addition salts of these compounds are useful as active ingredients of Mesostigmata mite control agents. This finding has led to the completion of the present invention.

[Chem. 2]

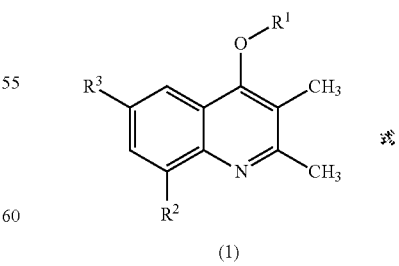

Formula (1)

[in the formula, $R^1$ represents a hydrogen atom, $-COR^4$, $-COOR^4$ (where $R^4$ represents an alkyl group having 1 to 4 carbon atoms), $-CH_2OCH_3$, or $-COCH_2OCH_3$; and $R^2$ and $R^3$ may be the same or different, and represent a hydrogen atom, a halogen atom, an alkyl group having 1 to 4 carbon atoms, or an alkoxy group having 1 to 4 carbon atoms].

The present invention provides:

[1] A Mesostigmata mite control agent which shows a controlling effect on a Mesostigmata mite, the control agent comprising, as an active ingredient, at least one selected from the group consisting of compounds represented by the above-described general formula (1), azoxystrobin, picoxystrobin, pyraclostrobin, kresoxim-methyl, trifloxystrobin, metominostrobin, orysastrobin, famoxadone, fluoxastrobin, pyribencarb, cyazofamid, amisulbrom, flutolanil, mepronil, isofetamid, fluopyram, carboxin, thifluzamide, fluxapyroxad, furametpyr, penflufen, penthiopyrad, boscalid, diflumetorim, fluazinam, ferimzone, fenpyroximate, and acid addition salts of these compounds.

[2] The Mesostigmata mite control agent according to [1], wherein
the Mesostigmata mite is a mite of the family Dermanyssidae or a mite of the family Macronyssidae.

[3] The Mesostigmata mite control agent according to [1], comprising as the active ingredient at least one selected from the group consisting of compounds represented by general formula (1) in which $R^1$ is an acetyl group or a methoxycarbonyl group, picoxystrobin, pyraclostrobin, orysastrobin, famoxadone, amisulbrom, diflumetorim, fluazinam, fenpyroximate, and acid addition salts of these compounds.

[4] A method of controlling a Mesostigmata mite, comprising using the Mesostigmata mite control agent according to [1].

[5] Use of a compound represented by the above-described general formula (1), azoxystrobin, picoxystrobin, pyraclostrobin, kresoxim-methyl, trifloxystrobin, metominostrobin, orysastrobin, famoxadone, fluoxastrobin, pyribencarb, cyazofamid, amisulbrom, flutolanil, mepronil, isofetamid, fluopyram, carboxin, thifluzamide, fluxapyroxad, furametpyr, penflufen, penthiopyrad, boscalid, diflumetorim, fluazinam, ferimzone, fenpyroximate, or an acid addition salt of any of these compounds for production of a Mesostigmata mite control agent.

[6] A Mesostigmata mite control method, comprising applying an effective amount of at least one selected from the group consisting of compounds represented by the above-described general formula (1), azoxystrobin, picoxystrobin, pyraclostrobin, kresoxim-methyl, trifloxystrobin, metominostrobin, orysastrobin, famoxadone, fluoxastrobin, pyribencarb, cyazofamid, amisulbrom, flutolanil, mepronil, isofetamid, fluopyram, carboxin, thifluzamide, fluxapyroxad, furametpyr, penflufen, penthiopyrad, boscalid, diflumetorim, fluazinam, ferimzone, fenpyroximate, and acid addition salts of these compounds to at least one selected from the group consisting of a Mesostigmata mite, a homoiotherm, an insect, and a habitat of a Mesostigmata mite, a homoiotherm, or an insect.

[7] The Mesostigmata mite control method according to [6], wherein
the effective amount of the active ingredient is directly sprayed to a Mesostigmata mite.

[8] The Mesostigmata mite control method according to [6], wherein
the effective amount of the active ingredient is sprayed to a homoiotherm or insect parasitized by a Mesostigmata mite.

[9] The Mesostigmata mite control method according to [6], wherein
the effective amount of the active ingredient is sprayed to a habitat of a Mesostigmata mite.

[10] The Mesostigmata mite control method according to [6], wherein
the effective amount of the active ingredient is sprayed to a habitat of a homoiotherm or insect parasitized by a Mesostigmata mite.

Advantageous Effects of Invention

The control agent of the present invention has an excellent effect on mites belonging to the suborder Mesostigmata that do harm to homoiotherms and insects by parasitism or blood-sucking.

DESCRIPTION OF EMBODIMENTS

A control agent of the present invention comprises, as an active ingredient, at least one selected from the group consisting of compounds represented by the above-described general formula (1), azoxystrobin, picoxystrobin, pyraclostrobin, kresoxim-methyl, trifloxystrobin, metominostrobin, orysastrobin, famoxadone, fluoxastrobin, pyribencarb, cyazofamid, amisulbrom, flutolanil, mepronil, isofetamid, fluopyram, carboxin, thifluzamide, fluxapyroxad, furametpyr, penflufen, penthiopyrad, boscalid, diflumetorim, fluazinam, ferimzone, fenpyroximate, and acid addition salts of these compounds, preferably at least one selected from the group consisting of compounds of the above-described general formula (1) in which $R^1$ is an acetyl group or a methoxycarbonyl group, azoxystrobin, picoxystrobin, pyraclostrobin, kresoxim-methyl, trifloxystrobin, metominostrobin, orysastrobin, famoxadone, fluoxastrobin, pyribencarb, cyazofamid, amisulbrom, flutolanil, mepronil, isofetamid, fluopyram, carboxin, thifluzamide, fluxapyroxad, furametpyr, penflufen, penthiopyrad, boscalid, diflumetorim, fluazinam, ferimzone, fenpyroximate, and acid addition salts of these compounds, or further preferably at least one selected from the group consisting of compounds of the above-described general formula (1) in which $R^1$ is an acetyl group or a methoxycarbonyl group, picoxystrobin, pyraclostrobin, orysastrobin, famoxadone, amisulbrom, diflumetorim, fluazinam, fenpyroximate, and acid addition salts of these compounds.

In the compound represented by general formula (1), $R^1$ is a hydrogen atom, $-COR^4$, $-COOR^4$, $-CH_2OCH_3$, or $-COCH_2OCH_3$. $R^2$ and $R^3$ may be the same or different, and each represent a hydrogen atom, a halogen atom, an alkyl group having 1 to 4 carbon atoms, or an alkoxy group having 1 to 4 carbon atoms. More preferably, in the above-described general formula (1), $R^1$ is $-COR^4$ or $-COOR^4$, and $R^4$ is an alkyl group having 1 to 4 carbon atoms (for example, a methyl group, an ethyl group, a propyl group, a butyl group, or the like, and more preferably, a methyl group). $R^2$ and $R^3$ each independently represent a halogen atom, a hydrogen atom, an alkyl group having 1 to 4 carbon atoms, or an alkoxy group having 1 to 4 carbon atoms, and examples thereof include a fluorine atom, a bromine atom, a chlorine atom, a methyl group, an ethyl group, a propyl group, a butyl group, and the like. These compounds represented by general formula (1) or acid addition salts thereof can be produced by the production method described in Japanese Patent No. 4152742.

In the present invention, examples of the "acid addition salts" include hydrochloric acid salts, nitric acid salts, phosphoric acid salts, acetic acid salts, and the like.

In the present invention, the compounds represented by general formula (1) can take the form of hydrates or solvates, and such hydrates and solvates are also encompassed by the compounds represented by general formula (1) in the present invention.

Some specific examples of the compounds represented by general formula (1) are compounds described in Table 1 in which $R^1$ is an acetyl group or a methoxycarbonyl group.

TABLE 1

| Name of Compound | Substituents | | |
|---|---|---|---|
| | $R^1$ | $R^2$ | $R^3$ |
| Compound A | COCH$_3$ | F | t-Bu |
| Compound B | COCH$_3$ | CH$_3$ | t-Bu |
| Compound C | COCH$_3$ | CH$_3$ | Br |
| Compound D | COCH$_3$ | CH$_3$ | F |
| Compound F | COOCH$_3$ | H | F |

The above-described "comprising as an active ingredient" includes, as a matter of course, a case where a pharmaceutically acceptable carrier or the like is contained according to the dosage form is included, and also means that an additional agent usable in combination may be contained.

The above-described additional agent is not particularly limited, and an agent such as a pesticide, an anthelmintic, an acaricide, a rodenticide, a microbicide, an antifungal agent, an antiviral agent, or a synergist, animal feed, or the like can be used in combination.

Examples of the pesticide, anthelmintic, acaricide, and rodenticide include organophosphorus compounds such as acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos, dicrotophos, dimethoate, dimethylvinphos, disulfoton, ethyl-p-nitrophenyl phenylthiophosphonothiate (EPN), ethion, ethoprophos, famphur, fenamiphos, fenitrothion, fenthion, fosthiazate, heptenophos, imicyafos, isofenphos, isopropyl O-(methoxyaminothio-phosphoryl) salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimifos, temephos, terbufos, tetrachlorvinphos, thiometon, triazophos, trichlorfon, and vamidothion; carbamate-based compounds such as alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC, xylylcarb, and fenothiocarb; nereistoxin derivatives such as bensultap, cartap, thiocyclam, and thiosultap-sodium; organochlorine compounds such as dicofol, tetradifon, chlordane, and endosulfan; phenylpyrazole-based compounds such as fipronil and ethiprole; avermectin-based compounds such as avermectin, ivermectin, milbemycin, selamectin, moxidectin, eprinomectin, abamectin, emamectin benzoate, lepimectin, and milbemectin; neonicotinoid-based compounds such as imidacloprid, clothianidin, thiamethoxam, acetamiprid, nitenpyram, thiacloprid, and dinotefuran; pyrethroid-based compounds such as acrinathrin, allethrin, bifenthrin, bioallethrin, cyclopro-thrin, cyfluthrin, cyhalothrin, cypermethrin, cyphenothrin, deltamethrin, empenthrin, esfenvalerate, ethofenprox, fenpropathrin, fenvalerate, flucythrinate, flumethrin, fluvalinate, halfenprox, imiprothrin, kadethrin, permethrin, phenothrin, prallethrin, pyrethrins, resmethrin, silafluofen, tefluthrin, tetramethrin (phthalthrin), tralomethrin, and transfluthrin; benzoylurea-based compounds such as bistrifluron, flucycloxuron, hexaflumuron, lufenuron, novaluron, noviflumuron, triflumuron, diflubenzuron, teflubenzuron, flufenoxuron, and chlorfluazuron; juvenile hormone-like compounds such as pyriproxyfen, methoprene, hydroprene, kinoprene, and fenoxycarb; and molting hormone-like compounds such as chromafenozide, halofenozide, methoxyfenozide, and tebufenozide. Moreover, other compounds include benzimidazole compounds such as spinetoram, spinosad, sulfoxaflor, flupyradifurone, triflumezopyrim, cyromazine, etoxazole, clofentezine, diflovidazin, hexythiazox, pymetrozine, pyrifluquinazon, diafenthiuron, azocyclotin, tricyclohexyltin hydroxide (cyhexatin), fenbutatin oxide, propargite, tetradifon, chlorfenapyr, DNOC, sulfluramid, pyflubumide, buprofezin, amitraz, hydramethylnon, acequinocyl, fluacrypyrim, bifenazate, fenazaquin, fenpyroximate, pyridaben, pyrimidifen, tebufenpyrad, tolfenpyrad, rotenone (derris), metaflumizone, indoxacarb spirodiclofen, spiromesifen, spirotetramat, cyenopyrafen, cyflumetofen, chlorantraniliprole, cyantraniliprole, flubendiamide, flonicamid, azadirachtin, benzomate (benzoximate), phenisobromolate (bromopropylate), chinomethionat, dicofol, GS-omega/kappa HXTY-Hvla peptide, pyridalyl, demiditraz, chlordimeform, ethiprole, fluhexafon, emodepside, monepantel, fenbendazole, and febantel; isoxazoline compounds such as pyrantel pamoate, meta-diamide, pyrifluquinazon, chlorantraniliprole, cyantraniliprole, spirotetramat, lepimectin, metaflumizone, pyrafluprole, pyriprole, hydramethylnon, triazamate, flometoquin, afidopyropen, fluralaner, and afoxolaner; sulfa drugs such as toltrazuril and sulfadimethoxine; coumarin-based compounds such as coumatetralyl; N,N-diethyl-m-toluamide (DEET), organometallic compounds, dinitro compounds, organosulfur compounds, urea-based compounds, triazine-based compounds, hydrazine-based compounds, and compounds represented by the following general formula (2) described in International Publication No. WO12/029672 and acid addition salts thereof acceptable to veterinary drugs.

[Chem. 3]

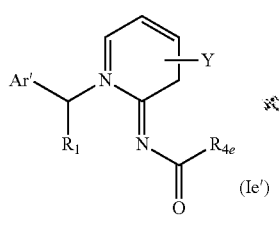

(Formula (2))

(2)

In this case, in the above-described general formula (2), Ar' represents an optionally substituted pyridyl group or an optionally substituted pyrimidyl group, $R_1$ represents a hydrogen atom or the like, Y represents a hydrogen atom, a halogen atom, a hydroxy group, an optionally halogen-substituted alkyl group, an optionally halogen-substituted alkyloxy group, a cyano group, a formyl group, or a nitro group, and $R_{4e}$ represents a halogen-substituted alkyl group, provided that when Ar' represents a 6-chloro-3-pyridyl group, a case where $R_1$ represents a hydrogen atom, Y represents a 5-methyl group, and $R_{4e}$ represents a trifluoromethyl group is excluded.

For controlling a Mesostigmata mite, it is possible to use a compound, as it is, which is at least one selected from the group consisting of compounds represented by general formula (1), azoxystrobin, picoxystrobin, pyraclostrobin, kresoxim-methyl, trifloxystrobin, metominostrobin, orysastrobin, famoxadone, fluoxastrobin, pyribencarb, cyazofamid, amisulbrom, flutolanil, mepronil, isofetamid, fluopyram, carboxin, thifluzamide, fluxapyroxad, furametpyr, penflufen, penthiopyrad, boscalid, diflumetorim, fluazinam, ferimzone, fenpyroximate, and acid addition salts of these compounds, or preferably at least one selected from the group consisting of compounds represented by general formula (1), picoxystrobin, pyraclostrobin, orysastrobin, famoxadone, amisulbrom, diflumetorim, fluazinam, fenpyroximate, and acid addition salts of these compounds. Moreover, it is also possible to use such a compound in the form of a formulation prepared by using a pharmaceutically acceptable carrier such as a solid carrier, a liquid carrier, or a gaseous carrier, if necessary, with the addition of a surfactant, an auxiliary agent, or the like.

The formulation can be prepared in any dosage form such as an oil solution, an emulsifiable concentrate, a wettable powder, a flowable, granules, a dust, an aerosol, a thermally vapor-releasing agent, an smoking agent, a fumigant, poison bait, bait, a suspension, microcapsules, an ULV agent, a liquid used on the skin or in a body cavity such as a spot-on formulation or a pour-on formulation, a shampoo formulation, a sheet formulation, a resin formulation, a sheet formulation, pellets, tablets, bolus, capsules, an injectable liquid, an oral liquid, an ointment, and a semi-solid preparation such as a gel. These can be used in various applicable forms. Regarding the preparation of the formulations, the formulations can be produced in usual manners by known methods.

Examples of the solid carrier used for producing the formulation include talc, bentonite, clay, kaolin, diatomaceous earth, vermiculite, white carbon, calcium carbonate, carbonates, hydrogen carbonates, phosphoric acid salts, aluminum oxide, silica, clay, feed components such as sugars, cellulose, crushed grains, starch, chemical fertilizers, and microcrystalline cellulose, and the like.

Examples of the liquid carrier include alcohols such as methanol, ethanol, n-hexanol, and ethylene glycol; ketones such as acetone and methyl ethyl ketone; cyclic ketones such as cyclohexanone; aliphatic hydrocarbons such as n-hexane, kerosene, cyclohexane, and lamp oil; aromatic hydrocarbons such as toluene, xylene, ethylbenzene, and methylnaphthalene; ethers such as diethyl ether, dioxane, and tetrahydrofuran; esters such as ethyl acetate and butyl acetate; nitriles such as acetonitrile and isobutyronitrile; nitriles such as diisopropyl ether and dioxane; acid amides such as dimethylformamide and dimethylacetamide; halogenated hydrocarbons such as dichloromethane, trichloroethane, and carbon tetrachloride; vegetable oils such as soybean oil and cottonseed oil; dimethyl sulfoxide; water; and the like.

Examples of the gaseous carrier include liquefied petroleum gases such as butane gas and LPG (liquefied petroleum gas); air; nitrogen; carbon dioxide gas; isopentane; dimethyl ether; and fluorocarbons.

Meanwhile, examples of the surfactant include cationic surfactants such as didecyldimethylammonium chloride, cetyltrimethylammonium chloride, [mono, bis(trimethylammoniummethylene chloride)]-alkyltoluene, benzalkonium chloride, domiphen bromide, and benzethonium chloride; nonionic surfactants such as polyoxyethylated castor oil, polyoxyethylated monoolefinic acid sorbitan, glyceryl monostearate, polyoxyethyl stearate, and alkylphenol polyflycol ether; amphoteric surfactants such as disodium n-lauryl-β-iminodipropionate, benzalkonium chloride, polyalkylpolyaminoethylglycine, and lecithin; fluorine-containing surfactants, OPPANOL, sodium dichloroisocyanurate, polyoxyethylene alkylphenol ethers, polyethylene glycol ethers, polyol esters, sugar alcohol derivatives, alkyl aryl ethers and polyoxyethylated produces thereof, alkyl sulfuric acid ester salts, and alkyl sulfonic acid salts.

The auxiliary agent may be a binder, a dispersant, an antioxidant, a preservative, an accidental ingestion prevention agent, a thickener, a foaming agent, a blowing agent, an antifoam, a blowing agent degradation accelerator, an oxidant, an oxidant degradation accelerator, a heat generation controlling agent, a pest-attracting flavor and/or fragrance, a stabilizer, or the like. Examples of these auxiliary agents include synthetic water-soluble polymers such as carboxymethyl cellulose, methyl cellulose, polyacrylate, alginate, gelatin, gum arabic, polyvinylpyrrolidone, polyvinyl alcohol, and methyl vinyl ether; maleic anhydride copolymers, polyethylene glycol, wax, colloidal silica, lignin derivatives, bentonite, saccharides, acidic isopropyl phosphate, BHT (2,6-di-tert-butyl-4-methylphenol), BHA (a mixture of 2-tert-butyl-4-methoxyphenol and 3-tert-butyl-4-methoxyphenol), azodicarbonamide, p,p'-oxybis(benzenesulfonyl hydrazide),N,N'-dinitrosopentamethylenetetramine, azobisisobutyronitrile, dibutylhydroxytoluene, nordihydroguaiaretic acid, dehydroacetic acid, zinc oxide, calcium oxide, powdered capsicum, vegetable oils, mineral oils, fatty acids and fatty acid esters, cheese flavors, and the like. Any ones of the above-described carriers, surfactants, and auxiliary agent may be used in combination.

Examples of the Mesostigmata mite control method and the Method of using a Mesostigmata mite control agent of the present invention include a method of application to a Mesostigmata mite and/or a habitat of a Mesostigmata mite by spreading (spraying or the like), smoldering, or the like; a method of application to a habitat of an insect or a habitat of a homoiotherm parasitized (or having a potential of being parasitized) by a Mesostigmata mite by spreading (spraying or the like), smoldering, or the like; a method of administration to an insect or homoiotherm parasitized (or having a potential of being parasitized) by a Mesostigmata mite by oral administration; parenteral administration such as injection (intramuscular, subcutaneous, intravenous, intraperitoneal); transdermal administration such as immersion, spraying, bathing, washing, pouring-on and spotting-on, and dusting; or nasal administration; a method of administration with a formed product using a strip, a plate, a band, a collar, an ear mark, a limb band, a label device, or the like; and the like.

For the application and administration, at least one active ingredient selected from the group consisting of compounds represented by general formula (1), azoxystrobin, picoxystrobin, pyraclostrobin, kresoxim-methyl, trifloxystrobin, metominostrobin, orysastrobin, famoxadone, fluoxastrobin, pyribencarb, cyazofamid, amisulbrom, flutolanil, mepronil, isofetamid, fluopyram, carboxin, thifluzamide, fluxapyroxad, furametpyr, penflufen, penthiopyrad, boscalid, diflumetorim, fluazinam, ferimzone, fenpyroximate, and acid addition salts of these compounds, or preferably at least one active ingredient selected from the group consisting of compounds represented by general formula (1), picoxystrobin, pyraclostrobin, orysastrobin, famoxadone, amisulbrom, diflumetorim, fluazinam, fenpyroximate, and acid addition salts of these compounds can be prepared in any dosage form suitable for the application method and the route of administration.

In the Mesostigmata mite control method and the Method of using a Mesostigmata mite control agent of the present invention, the amount of the active ingredient applied when the active ingredient is applied to a Mesostigmata mite, a homoiotherm, an insect, or Habitat of a Mesostigmata mite, a homoiotherm, or an insect can be changed, as appropriate, according to the environment of the use. In a case of application to a plane, the amount of at least one active ingredient selected from the group consisting of compounds represented by general formula (1), azoxystrobin, picoxystrobin, pyraclostrobin, kresoxim-methyl, trifloxystrobin, metominostrobin, orysastrobin, famoxadone, fluoxastrobin, pyribencarb, cyazofamid, amisulbrom, flutolanil, mepronil, isofetamid, fluopyram, carboxin, thifluzamide, fluxapyroxad, furametpyr, penflufen, penthiopyrad, boscalid, diflumetorim, fluazinam, ferimzone, fenpyroximate, and acid addition salts of these compounds, or preferably at least one active ingredient selected from the group consisting of compounds represented by general formula (1), picoxystrobin, pyraclostrobin, orysastrobin, famoxadone, amisulbrom, diflumetorim, fluazinam, fenpyroximate, and acid addition salts of these compounds is generally in the range of 0.01 to 5000 mg/m². In a case of application to a space, the amount of at least one active ingredient selected from the group consisting of compounds represented by general formula (1), azoxystrobin, picoxystrobin, pyraclostrobin, kresoxim-methyl, trifloxystrobin, metominostrobin, orysastrobin, famoxadone, fluoxastrobin, pyribencarb, cyazofamid, amisulbrom, flutolanil, mepronil, isofetamid, fluopyram, carboxin, thifluzamide, fluxapyroxad, furametpyr, penflufen, penthiopyrad, boscalid, diflumetorim, fluazinam, ferimzone, fenpyroximate, and acid addition salts of these compounds, or preferably at least one active ingredient selected from the group consisting of compounds represented by formula (1), picoxystrobin, pyraclostrobin, orysastrobin, famoxadone, amisulbrom, diflumetorim, fluazinam, fenpyroximate, and acid addition salts of these compounds is generally in the range of 0.1 to 1000 mg/m³.

When the Mesostigmata mite control agent of the present invention is administered to a homoiotherm, the amount of the Mesostigmata mite control agent administered is as follows. Specifically, in a case of transdermal administration, the amount of at least one active ingredient selected from the group consisting of compounds represented by general formula (1), azoxystrobin, picoxystrobin, pyraclostrobin, kresoxim-methyl, trifloxystrobin, metominostrobin, orysastrobin, famoxadone, fluoxastrobin, pyribencarb, cyazofamid, amisulbrom, flutolanil, mepronil, isofetamid, fluopyram, carboxin, thifluzamide, fluxapyroxad, furametpyr, penflufen, penthiopyrad, boscalid, diflumetorim, fluazinam, ferimzone, fenpyroximate, and acid addition salts of these compounds, or preferably at least one active ingredient selected from the group consisting of compounds represented by general formula (1), picoxystrobin, pyraclostrobin, orysastrobin, famoxadone, amisulbrom, diflumetorim, fluazinam, fenpyroximate, and acid addition salts of these compounds is generally in the range of 0.01 to 2000 mg/kg of the body weight of the homoiotherm. In a case of oral administration, the amount of the active ingredient is generally in the range of 0.01 to 500 mg/kg of the body weight of the animal.

In general, the Mesostigmata mite control agent of the present invention can be used as it is or after being diluted with a solvent such as water.

Examples of Mesostigmata mites against which the Mesostigmata mite control agent of the present invention is effective or at which the Mesostigmata mite control method of the present invention is targeted include mites of the family Dermanyssidae such as red mite (*Dermanyssus gallinae*); mites of the family Macronyssidae such as northern fowl mite (*Ornithonyssus sylviarum*) and tropical fowl mite (*Ornithonyssus bursa*); mites of the family Ascidae such as *Blattisocius keegani* and *Blattisocius dentriticus*; mites of the family Halarachnidae such as *Dermanyssus hirundinis*, tropical rat mite (*Ornithonyssus bacoti*), *Laelaps echidninus*, canine nasal mite (*Pneumonyssus caninum*), *Laelaps jettmari*, and *Pneumonyssus simicola*; mites of the family Laelaptidae such as *Varroa* mite (*Varroa destructor*); and the like, of which preferred are mites of the family Dermanyssidae such as red mite (*Dermanyssus gallinae*) and mites of the family Macronyssidae such as northern fowl mite (*Ornithonyssus sylviarum*) and tropical fowl mite (*Ornithonyssus bursa*).

Insects and homoiotherms which are parasitized by or whose blood is sucked by Mesostigmata mites against which the Mesostigmata mite control agent of the present invention is effective or at which the Mesostigmata mite control method of the present invention is targeted include mammals such as humans, cattle, horses, pigs, sheep, goats, camels, donkeys, dogs, cats, rabbits, monkeys, guinea pigs, and hamsters; birds such as chickens, domestic ducks, geese, quails, and turkeys; and insects such as honeybees, of which birds are preferred.

EXAMPLES

Hereinafter, Examples of the present invention are described in detail; however, the present invention is not limited thereto. Representative formulation examples of the present invention are shown below.

(Formulation Example 1) Wettable Powder

Compound A of the present invention (20%), clay (40%), diatomaceous earth (32%), white carbon (2%), sodium lauryl sulfate (1%), and calcium lignosulfonate (5%) were uniformly mixed and crushed to prepare a wettable powder.

(Formulation Example 2) Flowable

Compound A of the present invention (20%), a naphthalenesulfonic acid formalin condensate (4%), propylene glycol (5%), xanthan gum (0.05%), a silicone antifoam (0.05%), and water (70.9%) were added, uniformly mixed, and crushed to prepare a flowable.

(Formulation Example 3) Flowable

Compound A of the present invention (20%), a polyoxyethylene tristyrylphenyl ether sulfate salt (2%), propylene glycol (5%), xanthan gum (0.2%), a silicone antifoam (0.5%), tricalcium phosphate (0.5%), and water (71.8%) were added, uniformly mixed, and crushed to prepare a flowable.

(Formulation Example 4) Dust

Compound A of the present invention (2%), clay (60%), talc (37%), and calcium stearate (1%) were uniformly mixed to obtain a dust.

(Formulation Example 6) Emulsifiable Concentrate

Compound A of the present invention (20%), N,N-dimethylformamide (20%), xylene (50%), and polyoxyethylene alkyl aryl ether (10%) were uniformly mixed until dissolution to obtain an emulsifiable concentrate.

(Formulation Example 7) Liquid

Compound A of the present invention (5%), hexylene glycol (50%), and isopropanol (45%) were uniformly mixed to obtain a liquid for transdermal administration.

(Formulation Example 8) Liquid

Compound A of the present invention (2%), dimethyl sulfoxide (10%), 2-propanol (35%), and acetone (53%) were uniformly mixed to obtain a liquid for spraying.

(Formulation Example 9) Liquid

Compound A of the present invention (2%) and liquid paraffin (98%) were uniformly mixed to obtain a liquid for (pouring-on) transdermal administration.

(Formulation Example 10) Aerosol Formulation

Compound A of the present invention (0.1 g) was mixed with NEO-CHIOZOL F (Chuo Kasei Co., Ltd.; kerosene (normal paraffin) (120 ml) and ethane gas (180 ml) to obtain an aerosol formulation.

(Test Example 1) Controlling Effect on Red Mites (*Dermanyssus gallinae*)

The tip of a Pasteur pipette was sealed with Parafilm, and an acetone solution (liquid agent) of each of the samples shown in Table 2 below diluted to a predetermined concentration was poured into the pipette through an upper portion thereof. One minute later, the Parafilm at the tip was detached, and the liquid agent was discharged. After the pipette was air dried, absorbent cotton was inserted to an upper end of the pipette, and 20 unfed adult red mites (*Dermanyssus gallinae*) were released into the pipette. After the tip was sealed with Hemato-Seal, the pipette was stored in the dark in an incubator at a temperature of 27 to 28° C. and a humidity of 50 to 60%. After 24, 48, and 72 hours had passed since the treatment, the mites were observed under a stereomicroscope to determine whether the mites were dead or alive and whether the mites were affected. Then, the ratio (%) of dead and affected mites was calculated according to the following formula. Spinosad, trichlorfon, and permethrin were used as control drugs.

The ratio (%) of dead and affected mites={(the number of dead mites+the number of affected mites)/(the number of survived mites+the number of affected mites+the number of dead mites)}×100

The results are shown below.

TABLE 2

| Test | Test concentration [ppm] | Ratio of dead and affected mites [%] | | |
|---|---|---|---|---|
| | | 24 hours later | 48 hours later | 72 hours later |
| Compound A of present invention | 1000 | 100 | 100 | 100 |
| | 200 | 7 | 81 | 98 |
| Compound B of present invention | 100 | 100 | 100 | — |
| Compound C of present invention | 100 | 91 | 95 | — |
| Compound D of present invention | 100 | 100 | 100 | — |
| Compound F of present invention | 50 | 55 | — | — |
| (Control drug) Spinosad | 1000 | 32 | 82 | 95 |
| | 200 | 33 | 69 | 72 |
| (Control drug) Trichlorfon | 5000 | — | 84 | — |
| (Control drug) Permethrin | 100 | — | 6 | — |

—: No data (Test Example 2) Controlling Effect on Red Mites (*Dermanyssus gallinae*)

Approximately 50 unfed adult red mites (*Dermanyssus gallinae*) were placed in a tall beaker (8 cm in diameter×15 cm in height), and a 18 mesh nylon net lid was placed on the beaker. A liquid agent (2.5 mL) obtained by diluting the flowable of Formulation Example 3 of the present invention with distilled water to a predetermined concentration was sprayed with a spray gun located at a height of 15 cm. After the spraying, the beaker was incubated at a temperature of 27 to 28° C. and a humidity of 50 to 60%. After 24 hours had passed since the treatment, the mites were observed under a stereomicroscope to determine whether the mites were dead or alive. Then, the ratio (%) of dead mites was calculated according to the following formula. In addition, a 50% propoxur formulation and distilled water were used as a control agent and a negative control, respectively.

The ratio (%) of dead mites={the number of dead mites/(the number of survived mites+the number of dead mites)}×100

The results are shown below.

TABLE 3

| | Concentration of Compound [g/m$^2$] | Ratio of dead mites [%] |
|---|---|---|
| Formulation of compound A of present invention | 0.2 | 100 |
| (Control agent) propoxur formulation | 1 | 96.1 |
| (Negative control) distilled water | — | 4 |

(Test Example 3) Controlling Effect on Northern Fowl Mites (*Ornithonyssus sylviarum*)

The tip of a Pasteur pipette was sealed with Parafilm, and an acetone solution (liquid agent) of each of the samples shown in Table 4 below diluted to a predetermined concentration was poured into the pipette through an upper portion thereof. One minute later, the Parafilm at the tip was detached, and the liquid agent was discharged. After the pipette was air dried, absorbent cotton was inserted to an upper end of the pipette, and 10 fed adult northern fowl mites (*Ornithonyssus sylviarum*) were released into the pipette. After the tip was sealed with Hemato-Seal, the pipette was stored in the dark in an incubator at 25° C. and at a humidity of 80%. After 2 and 24 hours had passed since the treatment, the mites were observed under a stereomicroscope to determine whether the mites were dead or alive and whether the mites were affected. Then, the ratio (%) of dead and affected mites was calculated.

The ratio (%) of dead and affected mites={(the number of dead mites+the number of affected mites)/(the number of survived mites+the number of affected mites+the number of dead mites)}×100

The results are shown below.

TABLE 4

| | Test concentration [ppm] | Ratio of dead and affected mites [%] | |
|---|---|---|---|
| | | 2 hours later | 24 hours later |
| Compound A of present invention | 1000 | 100 | 100 |
| | 200 | 53 | 100 |
| | 50 | 13 | 92 |
| (Control drug) Spinosad | 200 | 3 | 94 |
| | 50 | 18 | 80 |
| (Control drug) Flumethrin | 50 | 100 | 100 |
| | 20 | — | 83 |
| | 5 | — | 67 |

—: No data (Test Example 4) Controlling Effect on Red Mites (*Dermanyssus gallinae*)

The tip of a Pasteur pipette was sealed with Parafilm, and an acetone solution (liquid agent) of each of the samples shown in Table 5 below diluted to a predetermined concentration was poured into the pipette through an upper portion thereof. One minute later, the Parafilm at the tip was detached, and the liquid agent was discharged. After the pipette was air dried, absorbent cotton was inserted to an upper end of the pipette, and 20 unfed adult red mites (*Dermanyssus gallinae*) were released into the pipette. After the tip was sealed with Hemato-Seal, the pipette was stored in the dark in an incubator at a temperature of 25 to 28° C. and a humidity of 40 to 60%. After 24 hours had passed since the treatment, the mites were observed to determine whether the mites were dead or alive and whether the mites were affected. Then, the ratio (%) of dead and affected mites was calculated according to the following formula. Acequinocyl and fluacrypyrim were used as control drugs.

The ratio (%) of dead and affected mites={(the number of dead mites+the number of affected mites)/(the number of survived mites+the number of affected mites+the number of dead mites)}×100

The results are shown below.

TABLE 5

| | Test concentration [ppm] | Ratio of dead and affected mites [%] |
|---|---|---|
| Azoxystrobin | 5000 | 55.2 |
| Picoxystrobin | 5000 | 80.5 |
| Pyraclostrobin | 5000 | 77.3 |
| Kresoxim-Methyl | 5000 | 52.8 |
| Trifloxystrobin | 5000 | 75.7 |

TABLE 5-continued

| | Test concentration [ppm] | Ratio of dead and affected mites [%] |
|---|---|---|
| Metominostrobin | 5000 | 50.0 |
| Orysastrobin | 5000 | 82.6 |
| Famoxadone | 5000 | 81.7 |
| Fluoxastrobin | 5000 | 66.5 |
| Pyribencarb | 5000 | 31.1 |
| Cyazofamid | 5000 | 23.2 |
| Amisulbrom | 5000 | 92.9 |
| Flutolanil | 5000 | 39.5 |
| Mepronil | 5000 | 52.1 |
| Isofetamid | 5000 | 17.4 |
| Fluopyram | 5000 | 50.5 |
| Carboxin | 5000 | 42.6 |
| Thifluzamide | 5000 | 63.2 |
| Fluxapyroxad | 5000 | 61.3 |
| Furametpyr | 5000 | 56.1 |
| Penflufen | 5000 | 20.5 |
| Penthiopyrad | 5000 | 35.0 |
| Boscalid | 5000 | 44.5 |
| Diflumetorim | 5000 | 100 |
| Fluazinam | 5000 | 82.5 |
| Ferimzone | 5000 | 53.5 |
| Fenpyroximate | 5000 | 100 |
| (Control Drug) Acequinocyl | 5000 | 93.3 |
| (Control Drug) Fluacrypyrim | 5000 | 19.3 |

INDUSTRIAL APPLICABILITY

As described above, according to the present invention, it is possible to provide a Mesostigmata mite control agent which controls Mesostigmata mites.

The invention claimed is:

1. A Mesostigmata mite control method, said method comprising
applying an effective amount of at least one active ingredient selected from the group consisting of compounds represented by the following Formula (1), and acid addition salts of these compounds, to at least one selected from the group consisting of a Mesostigmata mite, a homoiotherm, an insect, a habitat of a Mesostigmata mite, a habitat of a homoiotherm, and a habitat of an insect:

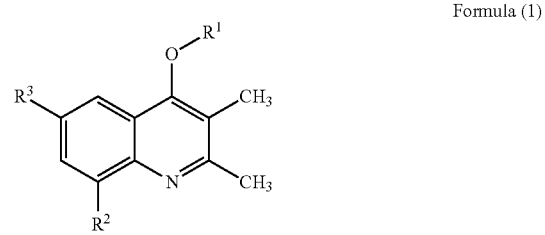

Formula (1)

wherein in Formula (1), $R^1$ is —$COCH_3$; and $R^2$ is F or —$CH^3$; and $R^3$ is a t-Bu group.

2. The method according to claim 1, wherein
the effective amount of the active ingredient is directly sprayed to a Mesostigmata mite.

3. The method according to claim 1, wherein
the effective amount of the active ingredient is sprayed to a homoiotherm or insect parasitized by a Mesostigmata mite.

4. The method according to claim 1, wherein the effective amount of the active ingredient is sprayed to a habitat of a Mesostigmata mite.

5. The method according to claim 1, wherein the effective amount of the active ingredient is sprayed to a habitat of a homoiotherm or insect parasitized by a Mesostigmata mite.

* * * * *